(12) United States Patent
Elangovan et al.

(10) Patent No.: US 8,351,499 B2
(45) Date of Patent: Jan. 8, 2013

(54) METHOD OF IDENTIFYING INCONSISTENT FIELD DOMINANCE METADATA IN A SEQUENCE OF VIDEO FRAMES

(75) Inventors: Premkumar Elangovan, Tamil Nadu (IN); Oliver Barton, Bristol (GB)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 12/421,389

(22) Filed: Apr. 9, 2009

(65) Prior Publication Data
US 2011/0157371 A1    Jun. 30, 2011

(30) Foreign Application Priority Data
Apr. 11, 2008   (EP) .................................... 08251412

(51) Int. Cl.
*H04N 7/12* (2006.01)

(52) U.S. Cl. .......... 375/240.01; 375/240.25; 375/240.26

(58) Field of Classification Search ................. 375/240, 375/240.01, 240.26, 240.25; 348/558
See application file for complete search history.

(56) References Cited

U.S. PATENT DOCUMENTS
2006/0139491 A1*   6/2006  Baylon et al. ................. 348/558
* cited by examiner

*Primary Examiner* — Allen Wong
(74) *Attorney, Agent, or Firm* — Kevin S. Ross; Michael A. Nelson (57) ABSTRACT

Embodiments of the present invention provide a method of identifying inconsistent field order flags for a sequence of video frames comprising: for each frame in the sequence of video frames analyzing the frame to make an initial determination of the field order for that frame; averaging the initial determination of the field order over a predefined number of most recently analyzed frames; and determining those frames for which the averaged field order does not match the field order identified by a respective field order metadata item associated with each frame by comparing the averaged field order for each frame to the respective field order metadata item.

14 Claims, 7 Drawing Sheets

METHOD OF IDENTIFYING INCONSISTENT FIELD DOMINANCE METADATA IN A SEQUENCE OF VIDEO FRAMES

FIELD OF THE INVENTION

The present method relates to video testing.

BACKGROUND

Video frames can be classified as either progressive or interlaced, depending upon the method used to display them. In a progressive frame the horizontal lines of pixels that make up the frame are displayed line by line from top to bottom. In contrast, an interlaced frame is created by displaying two fields in turn, one field (known as the top field) containing the top line of the frame and every second subsequent line, and the other field (the bottom field) containing the second line from the top and every second subsequent line, thus including the bottom line of the frame. Interlaced frames rely on the fact that it takes time for the first field of displayed pixels to decay from the display apparatus, during which time the second field is displayed, so as to create the illusion of a single frame containing all the lines of pixels.

The fields of an interlaced video frame are captured sequentially, which means that there is a small time delay between the first field to be captured and the second field to be captured. It is possible for the information contained in the scene to change in this time interval and for this reason it is desirable that the fields of the video frame are displayed in the correct order.

Interlaced video frames can be described as either "top field first" or "bottom field first", depending upon which of the fields making up the frame is intended to be displayed first. As there is small delay between displaying the first field and displaying the second field, the field intended to be displayed second may contain different information from that contained in the field intended to be displayed first, for example if movement has occurred in the frame in the delay between displaying the first and second fields. Such differences between the field intended to be displayed first and the field intended to be displayed second are known as "inter-field motion". If fields containing inter-field motion are displayed in an incorrect order, distortion may appear in the displayed frame. In an interlaced display, for example, the video typically becomes juddery or shaky as information appears earlier than it was intended to appear. In a progressive display, the reversal of the fields will not cause such juddery or shaky video, as the fields are put together and displayed at a rate of N frames per second, rather than 2N fields per second, but regardless of the field order, the inter-field motion will lead to combing artifacts, i.e. areas of the frames where rows of lines appear, giving a "combed" appearance.

The property of a sequence of video frames by which the sequence can be described as either "top field first" or "bottom field first" is referred to as the field dominance (or field polarity) and is generally dictated by the video standards under which the video sequence is either recorded or intended to be displayed. For example, the most popular European broadcast standard is PAL (phase alternating line) and has top field first field dominance, whereas the American broadcast standard is NTSC (national television systems committee) which has bottom field first field dominance. If a video sequence having a particular field dominance is played back through a video system configured to play video sequences of the opposite field dominance, or in other words if the field order is reversed, severe visual artifacts may be produced, for example any motion in the video sequence may have a juddering and jittery appearance. Such artifacts will only occur when the video sequence is displayed on an interlaced display but will not be visible when viewed on a progressive display, as in such a display successive fields are combined together to form a frame for displaying.

Metadata contained within the video stream will typically include a flag indicating whether a particular video frame is encoded as either top field first or bottom field first. However, it is possible for this flag to be either corrupted (or omitted) such that the flag is incorrectly set during video processing, for example as a result of an editing or transcoding action. It would therefore be beneficial to video producers and broadcasters to be able to quickly and easily determine those frames within a video sequence for which the filed dominance flag might be incorrectly set.

SUMMARY

According to an embodiment of the present invention there is provided a method of identifying inconsistent field order flags for a sequence of video frames comprising: for each frame in the sequence of video frames analyzing the frame to make an initial determination of the field order for that frame; averaging the initial determination of the field order over a predefined number of most recently analyzed frames; and determining those frames for which the averaged field order does not match the field order identified by a respective field order flag associated with each frame by comparing the averaged field order for each frame to the respective field order flag.

The initial determination of the field order may be indeterminate. Furthermore, the indeterminate field order of an analyzed frame may be replaced by the averaged field order.

The averaging step may comprise allocating as the averaged field order the field order of a predetermined proportion of the predefined number of frames having the same field order, the predetermined proportion of frames preferably comprising at least 30%.

Preferably, the predefined number of frames over which the averaging step is performed is 25.

Embodiments of the present invention will now be described below by way of non-limiting illustrative example only, with reference to the accompanying figures.

DETAILED DESCRIPTION

Figure 1:
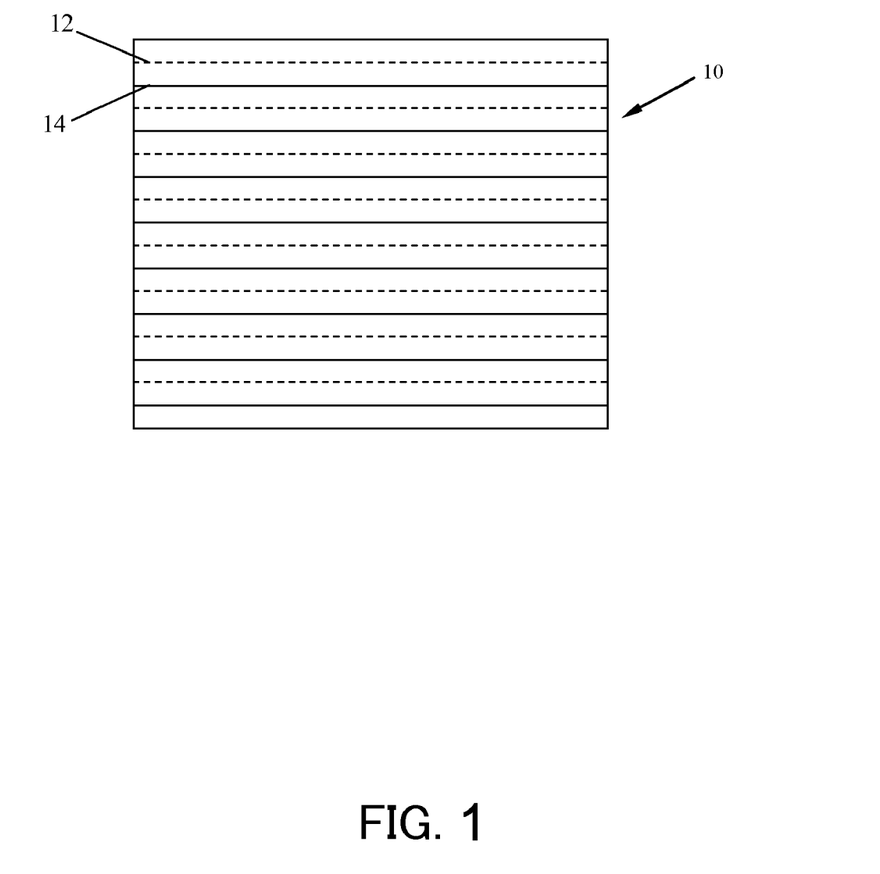
FIG. 1 schematically illustrates an interlaced video frame.

Referring to FIG. 1, a video frame 10 is schematically illustrated that comprises horizontal lines 12, 14 that make up an image. Typically, a frame conforming to the PAL standard comprises 625 such lines of pixels, whilst a frame conforming to the US NTSC standard comprises 525 lines. As previously mentioned, each video frame 10 comprises two separate fields. One field will contain the top line of pixels and every subsequent second line, i.e. it will contain all of the broken lines illustrated in the representation of FIG. 1. This field is referred to as the top field. The other field will contain the second line of pixels and every subsequent second line, such that it includes the bottom line of pixels in the video frame, i.e. the solid line of pixels represented in FIG. 1. This field is referred to as the bottom field.

Although individual video sequences will be recorded with a constant, single, field dominance, it is quite likely that a number of such individual video sequences will be edited together to form the final broadcast video and it is probable that different individual video sequences will have different field dominance, since the individual video sequences may be captured and collated using the differing broadcast standards available and applicable. As previously noted, the metadata indicating the field dominance for individual frames or sequences of frames may not be preserved during this editing process or subsequent transcoding processes.

Figure 2:
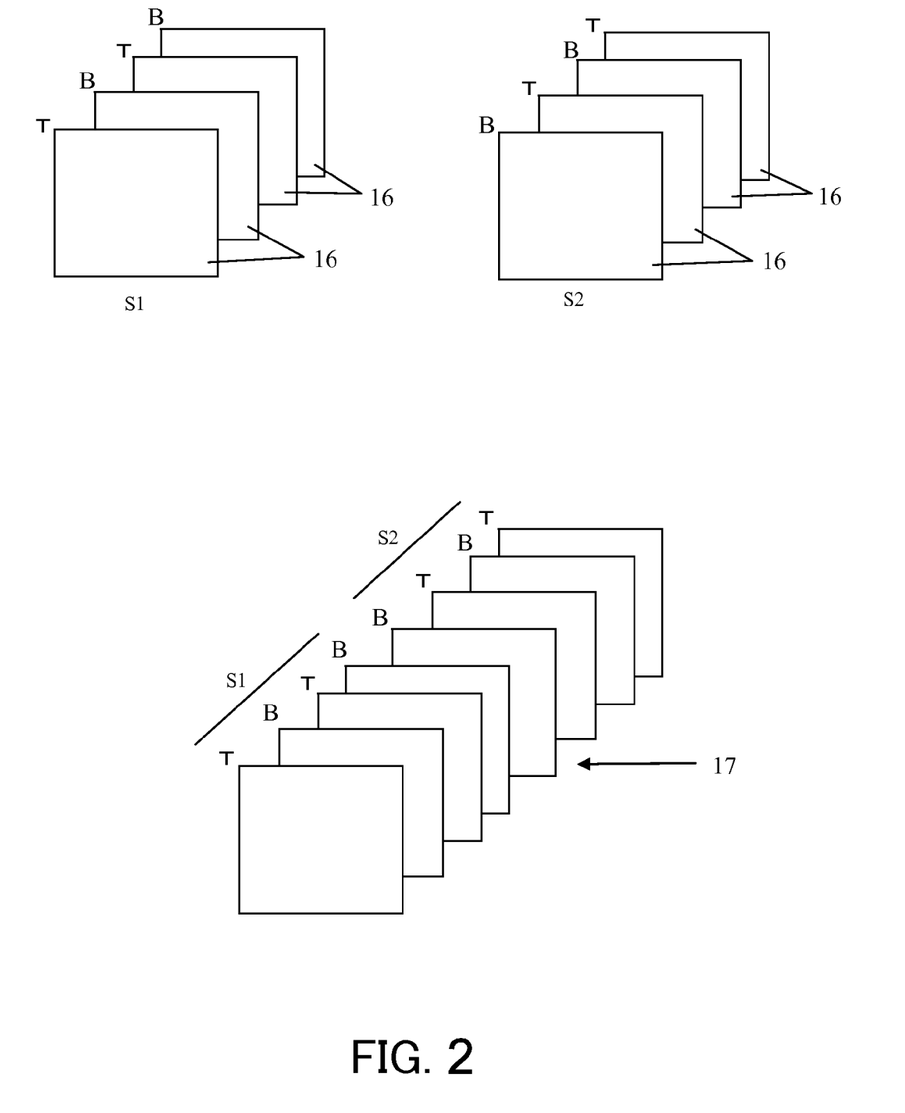
FIG. 2 schematically illustrates the editing of two sequences of video fields with opposite field dominance where a field order error may occur if the metadata is constant.

An example of a first editing scenario of a pair of video sequences is schematically illustrated in FIG. 2. A first sequence S1 of individual video fields is illustrated with each field 16 is labeled as either a top field T or a bottom field B. In the first field sequence S1 the field dominance is a top field first. A second sequence of video fields S2 is also illustrated, the field dominance for the second sequence being bottom field first. If the flag in the meta data for the edited sequence 17 is set to top field first for the first 2 frames/4 fields (S1) and then changes to bottom field first for the subsequent 2 frames/4 fields (S2), then there will not be any field dominance errors. However, if the meta data flag points to top field first throughout the edited sequence 17 that would result in video being juddery starting from the $3^{rd}$ frame/$5^{th}$ field.

Figure 3:
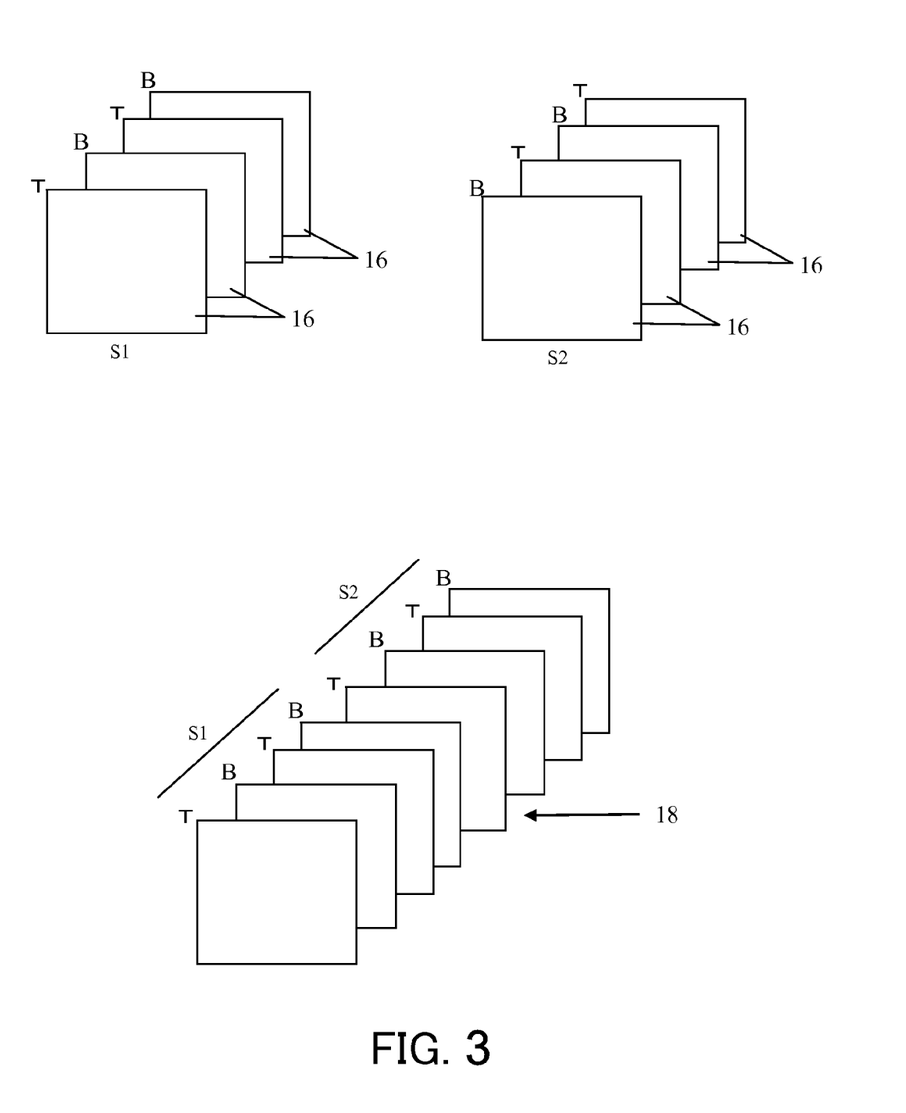
FIG. 3 schematically illustrates the editing of the two sequences of video fields shown in FIG. 2 where a field order error may occur if the metadata is not constant.

An example of second editing scenario of a pair of video sequences is schematically illustrated in FIG. 3. In an analogous fashion to FIG. 2, first and second sequences S1, S2 of video fields 16 are illustrated, the first sequence S1 being top field first, whilst the second sequence S2 is bottom field first, together with the edited sequence 18. However, in FIG. 2, the edited sequence 17 is edited such that the second sequence S2 starts with a bottom field, whilst in FIG. 3, the edit of S2 starts with a top field. If the flag in the meta data for the edited sequence 18 in FIG. 3 is set to top field first throughout the sequence starting from the $1^{st}$ frame, there will not be any field dominance errors. However, if the meta data flag is set to bottom field first from the $3^{rd}$ frame/$5^{th}$ field of the edited sequence 18, that would result in video being juddery starting from $3^{rd}$ frame/$5^{th}$ field of the edited sequence 18.

Consequently, according to embodiments of the present invention a consistency check is made between the field order of the video frames indicated by the metadata and the field order determined by analysis of the video frames. The field order may be determined by performing any suitable video analysis technique, such as spatial correlation within and around one or more edges of one or more objects in a frame as disclosed in US patent application US 2006/0139491 A1. However, in preferred embodiments of the present invention the field dominance is determined according to the following method, which is also disclosed in the applicant's co-pending U.S. patent application Ser. No. 12/420,737, entitled *A Method of Determining Field Dominance in a Sequence of Video Frames*, filed Apr. 8, 2009, which is hereby incorporated herein by reference.

Figure 4:
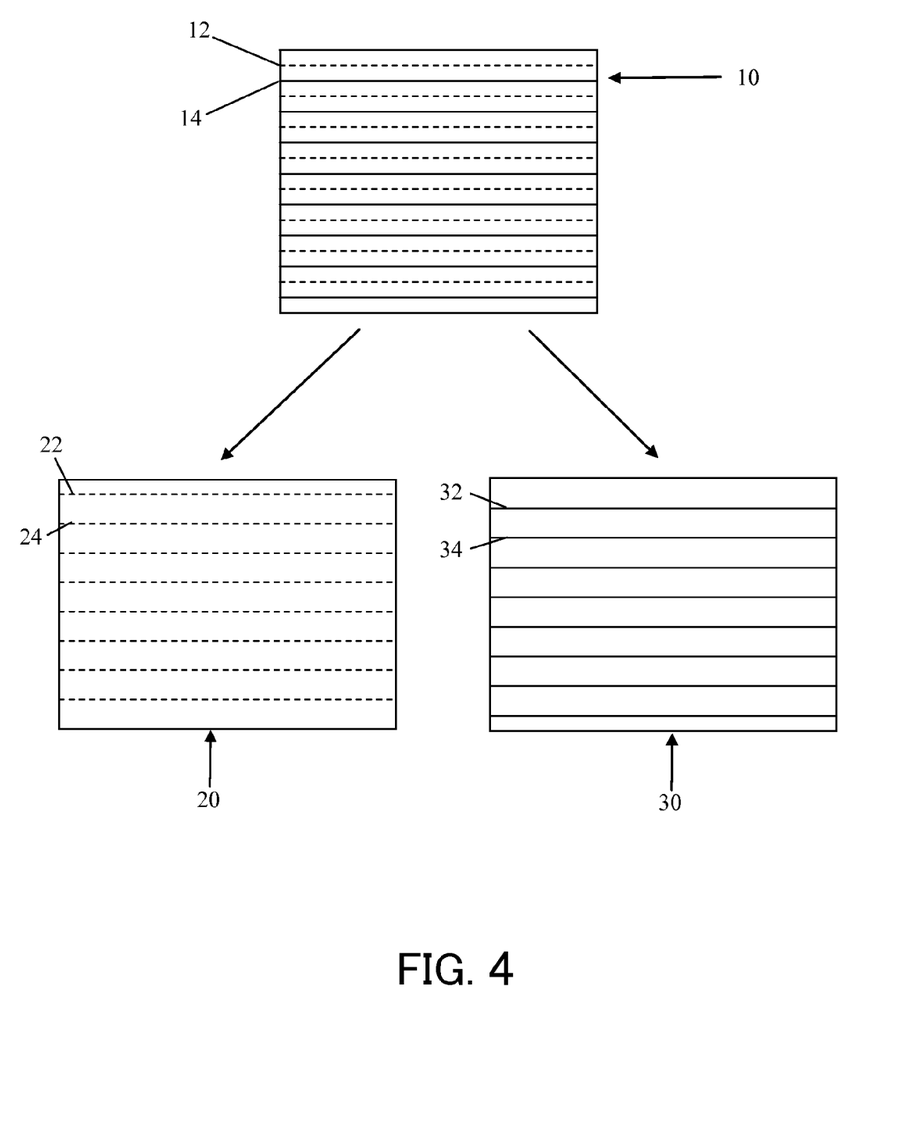
FIG. 4 schematically illustrates generating a pair of video fields from an interlaced video frame.

To determine the field dominance according to an embodiment of the present invention an individual video frame 10 must be divided into top and bottom fields. Referring to FIG. 4, the top field 20 is generated by extracting the top line 12 of pixels from the frame 10 and every second subsequent line of pixels and storing these lines in the position from which they were extracted in the frame 10 in the top field 30. Similarly, the bottom field 30 is generated by extracting the second line 14 of pixels and every subsequent second line of pixels and storing them in the position from which they were extracted from the frame 10 in the bottom field 30.

The top and bottom fields 20, 30 each contain only half of the information contained in the video frame 10 from which they were generated. Therefore, the top and bottom fields must be interpolated to produce top and bottom field frames each containing as much information as the video frame 10. Any interpolation method may be used in embodiments of the present invention, however in the embodiment illustrated in FIG. 4 adjacent lines of pixels in the field to be interpolated are averaged. Thus, for example, to generate the second line of an interpolated top field frame, as illustrated at 40 in FIG. 5, the value of each pixel of the top line 22 of the top field 20 is summed with the value of the corresponding pixel of the second line 24 of the top field 20. The resulting sum of pixel values is divided by 2 to obtain an average pixel value and the "missing" second line of the top field 20 is built up from the average pixel values calculated in this way.

Figure 5:
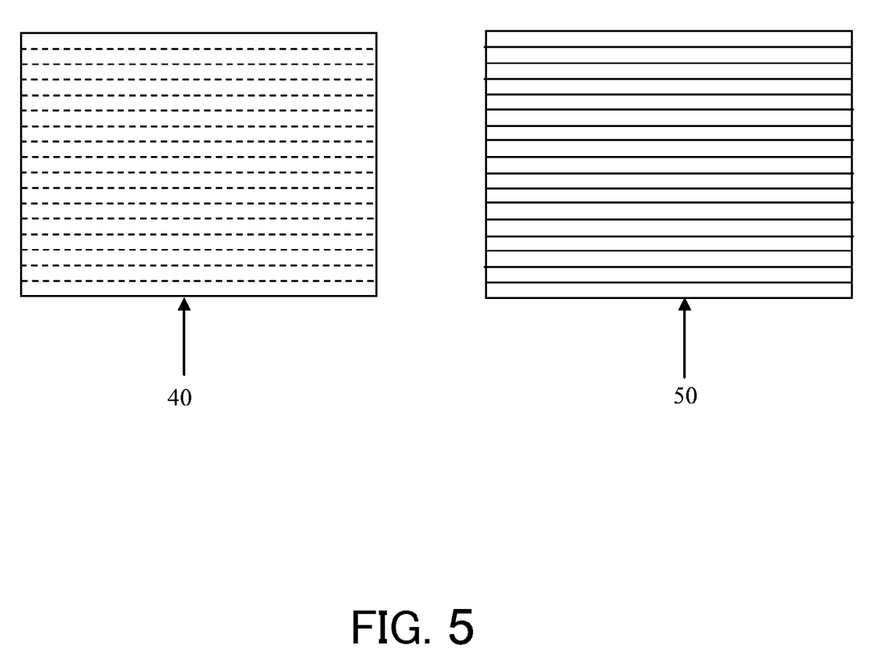
FIG. 5 schematically illustrates a pair of interpolated top and bottom field frames.

Similarly, to generate the second line of an interpolated bottom field frame, shown as 50 in FIG. 5, the value of each pixel of the first line 32 of the bottom field 30 is summed with the value of the corresponding pixel of the second line 34 of the bottom field 30. The resulting sum of pixel values is divided by 2 to obtain an average pixel value and the "missing" second line of the bottom field 30 is built up from the average pixel values calculated in this way. This process is repeated to generate, from the top and bottom fields 20, 30, interpolated top and bottom field frames 40, 50, each of which contains as much information as the frame 10 from which the top and bottom fields 20, 30 were generated. The interpolated top and bottom field frames 40, 50 are effectively progressive frames which represent the information that can be seen at the time at which each of the top and bottom fields 30, 40 are displayed in an interlaced system.

The interpolated top and bottom field frames 40, 50 are then each correlated with the previous frame in the video sequence to the frame from which the interpolated field frames have been generated and also correlated with the next frame in the video sequence. The rationale for performing this correlation process is derived from the knowledge that the time difference between two frames in a video sequence is inversely proportional to the correlation between them. This principle can also be applied to the separate fields that constitute each frame. The field to be displayed first in a particular frame will have a closer relation to the preceding frame in the video sequence, whilst the field to be displayed second will have a closer correlation to the succeeding frame. As previously mentioned, both the interpolated top field frame ($X_T$) and the interpolated bottom field frame ($X_B$) are correlated with the previous frame ($X_p$) and the next future frame ($X_f$) such that for each frame in the video sequence four separate correlation values are obtained:

a=correlation ($X_T$, $X_p$)
b=correlation ($X_B$, $X_f$)
c=correlation ($X_T$, $X_f$)
d=correlation ($X_B$, $X_p$)

Any suitable metric may be used to measure the correlation, such as peak signal to noise ratio (PSNR), mean square error (MSE) or mean absolute error (MAE). The following table shows the possible results of the correlation check and their interpretation.

| Number | Condition | Interpretation |
| --- | --- | --- |
| 1 | a > c and b > d | Field order = top field first |
| 2 | a < c and b < d | Field order = bottom field first |
| 3 | other conditions | Indeterminate result |

Figure 6:
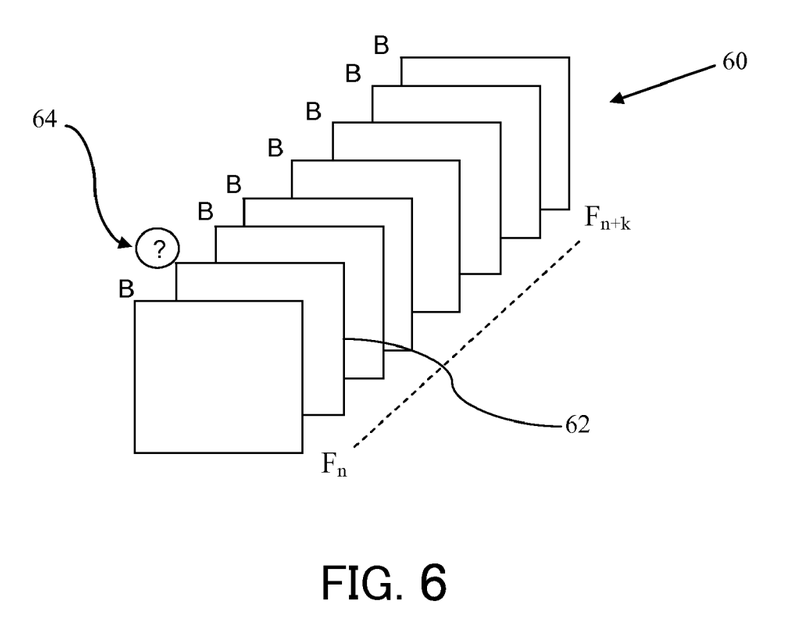
FIG. 6 schematically illustrates the field order averaging process of an embodiment of the present invention.

It can be seen that result 3 of this frame analysis technique does not produce a definite indication of the field order. To overcome this the method of the present invention applies an averaging technique to assign a field order to those 'indeterminate' frames that applies the principle that it is more probable for a single frame to have the same field order as the surrounding frames. Consequently, an average over a moving window of k frames is taken, with the field order being assigned according to a simple majority across the k frames. An example of this is illustrated in FIG. 6, where a sequence of k frames 60 is illustrated, each frame having an indicated field order as determined by an analysis process. It can be seen that for the second frame 62 no determined field order 64 is indicated. However, the remaining k−1 frames are all indicated as bottom field first B. Consequently, according to embodiments of the present invention the second frame 62 is considered to be bottom field first B also. The inventors of the present application have found that allocating the field dominance according to a 30% percent majority across a window of 25 frames provides robust results. However, it will be appreciated that alternative numbers of frames within the moving window and/or a different majority measure may equally be applied within the scope of the present invention as desired.

Having assigned or determined a field order to all of the frames in the sequence of interest, the determined field order is for each frame is compared to the field order indicated by its metadata. Where the field order given by the metadata does not match the field order indicated by the analysis results then this inconsistency is either immediately flagged to a user or stored in a log file for subsequent retrieval. Alternatively, when such a mismatch occurs the metadata may be automatically amended to match the field order indicated by the results of the analysis process.

Figure 7:
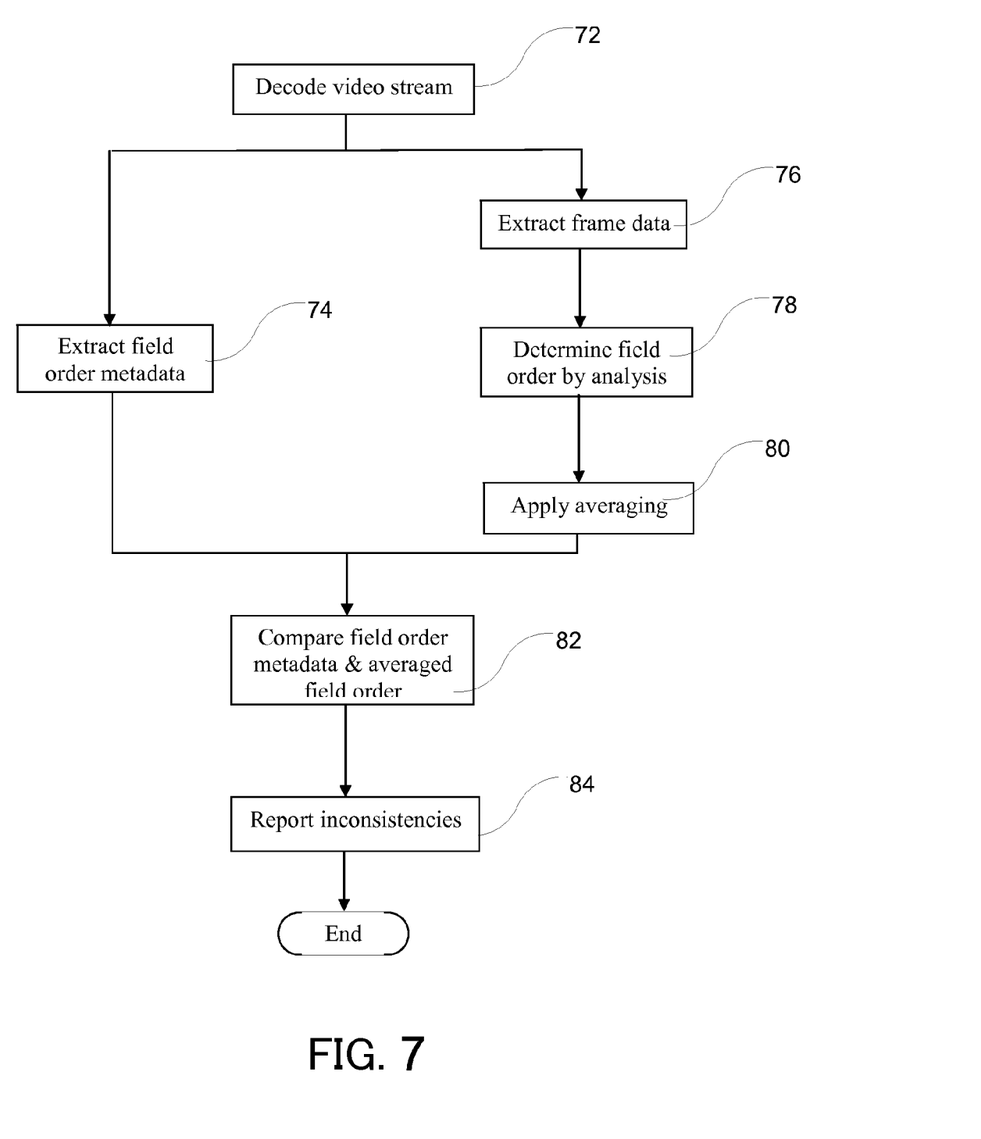
FIG. 7 schematically illustrates the method steps of an embodiment of the present inventions.

The basic method of embodiments of the present invention is illustrated in FIG. 7. A video stream is decoded at Step 72. At Step 74, field order data is extracted from the decoding video stream. In a separate process, the order data is determined independently of the metadata. Frame data is extracted at Step 76. At Step 78, the field data is determined by analysis as described above. Averaging is applied at Step 80. At Step 82 the field order metadata is compared to the averaged field order determined by analysis. Inconsistencies between the averaged field order and the field order metadata are reported as provided at Step 84.

Consequently in embodiments of the present invention there is provided a robust method of identifying any field order mismatches in a sequence of video frames.

What is claimed is:

1. A method of identifying inconsistent field order flags for a sequence of video frames comprising:

for each frame in the sequence of video frames analyzing the frame to make an initial determination of the field order for that frame;

averaging the initial determination of the field order over a predefined number of most recently analyzed frames; and determining those frames for which the averaged field order does not match the field order identified by a respective field order metadata item associated with each frame by comparing the averaged field order for each frame to the respective field order metadata item.

2. The method of claim 1, wherein the initial determination of the field order is indeterminate.

3. The method of claim 2, wherein the indeterminate field order of an analyzed frame is replaced by the averaged field order.

4. The method of claim 3, wherein the averaging step comprises allocating as the averaged field order the field order of a predetermined proportion of the predefined number of frames having the same field order.

5. The method of claim 4, wherein the predefined number of frames over which the averaging step is performed is 25.

6. The method of claim 3, wherein the predefined number of frames over which the averaging step is performed is 25.

7. The method of claim 2, wherein the averaging step comprises allocating as the averaged field order the field order of a predetermined proportion of the predefined number of frames having the same field order.

8. The method of claim 7, wherein the predefined number of frames over which the averaging step is performed is 25.

9. The method of claim 2, wherein the predefined number of frames over which the averaging step is performed is 25.

10. The method of claim 1, wherein the averaging step comprises allocating as the averaged field order the field order of a predetermined proportion of the predefined number of frames having the same field order.

11. The method of claim 10, wherein the predetermined proportion of frames comprises at least 30%.

12. The method of claim 11, wherein the predefined number of frames over which the averaging step is performed is 25.

13. The method of claim 10, wherein the predefined number of frames over which the averaging step is performed is 25.

14. The method of claim 1, wherein the predefined number of frames over which the averaging step is performed is 25.

* * * * *